Oct. 18, 1932.  J. A. WILEY  1,883,199
SELECTIVE MARK INDICATOR FOR TESTS
Filed Sept. 16, 1931
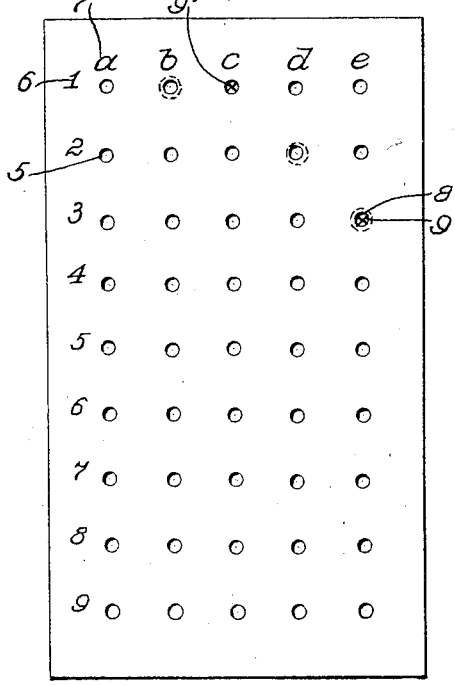
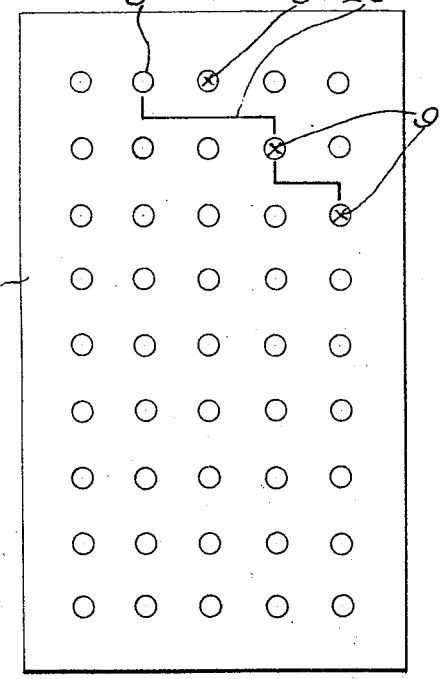
Inventor
J. A. Wiley, by
G. C. Kennedy, Attorney Patented Oct. 18, 1932

1,883,199

UNITED STATES PATENT OFFICE

JAMES A. WILEY, OF CEDAR FALLS, IOWA

SELECTIVE MARK INDICATOR FOR TESTS

Application filed September 16, 1931. Serial No. 563,030.

My invention relates to improvements in selective mark indicators for tests, and the object of my improvement is to supply for educational or other mental tests, an apparatus which includes a special answer sheet having thereon certain printed or otherwise inscribed or visibly marked locations which, as also other but non-indicated parts of the sheet, may receive an examinee's answer marks, and which make it possible for the examiner to easily and rapidly discriminate correctly marked answers from incorrect ones, while computing a score during an examination, the apparatus which removably receives such a sheet being so constructed and used in combination with said sheet and its location indications, as to prevent the examinee from detecting such locations either before or after recording his answers upon the sheet.

Another object of my improvement is when desired, to place upon such an answer sheet, visible marks between certain location indications adapted for their assembled association, whereby the examiner may follow those location indications successively at a glance which have received correct answers by the examinee's marks thereon, said marks, when the sheet is assembled in the apparatus ready for use by the examinee, being concealed beneath the top cover of the apparatus in addition to the concealment of these location indications similarly elsewhere whether marked upon by the examinee or not.

Another object of my improvements is to place on the answer receiving sheet of the device marked indications for receiving the answers of the examinee, which indications relating to the various suggested answers to each question of a questionary are variously differentially visibly represented, whereby the examiner may weigh the answer made by the examinee to any of such suggested questionary answers at different values according to the more or less appropriateness of such examinee's answer on any such differentially represented indication, thus giving some credit to the examinee for an approximately correct answer with less weight, however, than the maximum credit to be given for the best selection of an answer.

My invention is also an improvement in the above regards, upon the invention of my pending application for patent, Serial Number 512,380, filed January 30, 1931.

I have accomplished the above objects by the means which are hereinafter described and claimed, and which are illustrated in the accompanying drawing, in which Fig. 1 is a top plan of the top permanent apertured cover of the device as mounted over the sheet 3 of Fig. 2. Fig. 2 is a top plan of a different sheet 3 with the cover 1 removed and such sheets being used singly in the device beneath and in contact with said top cover, the figure also showing back of this sheet and partially concealed thereby, the imperforate back cover of the device made also of permanent material to cooperate with said top cover and the said sheet 3 having certain kinds of visibly differentially marked locations thereon. Fig. 3 is a modification of said sheet having as many location circles as the apertures 5 of the cover 1 and wherein certain printed or otherwise inscribed ones of the location indications thereon are brought into visible association by connecting or directing lines.

In my apparatus the numerals 1 and 2 respectively denote the top and back covers, of suitable permanent rigid material, the back cover 2 being imperforate, and the top cover 1 having numerous like relatively small apertures 5 in both vertical and horizontal rows, the apertures being circular but may be of any other desired configuration, and both covers adapted to be in registration and to be clamped or otherwise fastened together by suitable means not shown. The intermediately positioned sheet 3, preferably registering with said covers, is imperforate. Upon this sheet, may be placed annular marks, or otherwise delineated outlined locations 8, which are of larger area than the small apertures 5 on the top cover, but are centered therewith so that these location delineations are entirely concealed below the cover 1. There may be a number of these large location indications 8 equal to the number of the apertures 5 on the cover 1, as in Fig. 3, or as shown on the sheet 3 of Fig. 2, only a certain number may be shown, and in the latter case only to show the locations on the sheet for the examinee to enter pencil or other marks or crosses 9 which show the correct answers only to questions on a questionary. It will be observed that in Fig. 2 at 9' one cross mark made by an examinee has been made through a cover aperture 5 upon the sheet 3 and which is not within a circle 8. This denotes that this mark 9' is for an incorrect answer to a certain questionary question. When the sheet 3 is removed from said covers, the examiner may by a glance discriminate the correct from the incorrect answers.

I have given herebelow a specimen of a questionary such as might be supplied the examinee for use in answering questions thereon, by selection of the most appropriate answer from among a number of suggested ones, for recording by a mark 9 or 9' on the sheet as selected, whether the selection be correct or incorrect. The questions and answers of the questionary have letters designating these answers, while the questions are numbered, and the rows of apertures whether vertical or horizontal are likewise designated on the cover 1 by said letters and numbers for guidance of the examinee in effecting his record of answers, respectively.

*Questionary*

1. The capital city of Iowa is:
    (a) Ottumwa
    (b) Iowa City
    (c) Davenport
    (d) Des Moines
    (e) Waterloo
2. The most reliable indication that a particular human trait is native, is:
    (a) Universality
    (b) Presence in primates
    (c) Value to the species
    (d) Present at birth
    (e) Appearance without a chance to learn.
3. All parts of the eye are accessory except:
    (a) The pupil
    (b) The lens
    (c) The iris
    (d) The cornea
    (e) The retina As stated, in this questionary, its suggested answers (a) to (e) inclusive are represented by the same characters (a) to (e) shown in a horizontal row at the top of the cover 1 at 7, over the vertical rows of holes at 6 thereon.

When the covers and such a sheet are assembled, any convenient clamping or locking means may be employed to temporarily retain them together to prevent displacements or tampering.

The student under test, using a pencil or the like, will after considering each proposition of the questionary serially, and if so considering Question 1, mark through one of the holes 5 of the cover 1 in the upper horizontal row a cross 9' for instance, and which marking may be through the small aperture selected as shown in Fig. 2. He proceeds in the same way, until he has marked through other holes on the sheet 3 for the other numbered questions on the questionary. When the sheet 3 is afterwards removed it will display upon its upper surface the marks 9 or 9' made by the examinee. The tester may then count either the most appropriate marks 9 shown in marked circles 8, or the incorrect answers marked at 9' on the sheet 3 without the circles 8. In the differentiated credit variation 8a, the examiner may count the weighed credit mark therein as a differentially valued answer to give the examinee the benefit of more or less merit in accuracy of his answer. All of the examinee's marks, therefore, are upon the top of the single sheet 3. This is an economy over the use of plural sheets or a doubled sheet as shown in my said prior application Serial No. 512,380. It is also easier and cheaper to print the circles 8 than to use punches and dies to make apertures in a sheet, and it is convenient to have all the markings on one sheet.

It will be observed that on the sheet 3 of Fig. 2 one location indication is an outlined square 8a instead of a circle 8. This indication different from another, or 8a is placed on the sheet like the indications 8 to center with a cover aperture 5. The indication 8a may be of any outlined shape or color which differentiates it from the circle 8, and the purpose of using this different indication is that in case the examiner desires to recognize for a secondary credit an answer suggested in the list of suggested answers to one question, and which has a psychological merit higher than and such as is not inherent in other and wholly incorrect answers, although less than the most appropriate answer, the marking of a sign $x$ in this place so as to appear within the square outline 8a will insure to the benefit of the examinee in the determining of his total rating, with a credit ratably commensurate.

On the sheet 3 shown in Fig. 3, I have shown certain linear marks printed or otherwise made permanently visible on the sheet at 10, and which have certain bends or angles to cause them to appear between and closely approaching the indications at 8 terminally so as to place in a visible association all of the indications 8 which are appropriated correctly in positions to take correct answer markings by the examinee in his consideration of the particular question relating thereto on the questionary. The reason for this kind of alinement is to help the examiner when tallying correct answers on the sheet after its being disassembled from the apparatus, for the eye can more readily and quickly follow such a linearly disposed and indicated train, than to pick out the correctly marked circles 8 when not so trained. This saves time and secures accuracy in discrimination. Instead of lines 10, other means for showing the successive alinement places of the circles 8 for correct answers may be used, and it should be observed that the lines need not touch the circles 8, but should always be concealed beneath the cover 1 as well as all the indications 8 or 8a which are centered with but outlined beyond the cover apertures 5. The lines 10 also may be used to aline mere blank spaces which take the place of indications 8, no part of the lines showing through the apertures 5. The incorrect marking 9' is not on a circle 8 on sheet 3 of Fig. 2, but it matters not that it may be on a circle 8 on the sheet 3 of Fig. 3, as the lines 10 show the correct circles.

Having described my invention, what I claim as new, and desire to secure by Letters Patent, is:

1. In a device for use in giving examinations of the kind in which the examinee indicates answers which he desires to give to the questions by marking through an apertured sheet upon a sheet below, a cover having apertures of relatively small size, and a removable sheet positioned closely beneath the cover having a desired number of larger circular location marks thereon to be positioned below said apertures and wholly concealed by the cover, whereby an examinee's markings made through such apertures may be discriminated as to their correctness or incorrectness.

2. In a device for use in giving examinations of the kind in which the examinee indicates answers which he desires to give to the questions by marking through an apertured sheet upon a sheet below, a cover having apertures of relatively small size in a desired relative arrangement, and a single face sheet below said cover contacting therewith and having on its contacting face, variably denoted location marks beneath certain of said apertures which location marks are provided to receive markings by the examinee which are appropriate, the sheet having lines on one face between said location marks, but which lines are wholly concealed beneath the cover.

3. In a device for use in giving examinations of the kind in which the examinee indicates answers which he desires to give to the questions by marking through an apertured sheet upon a sheet below, a cover having apertures of relatively small size in a desired relative arrangement to suggested answers to questions on a questionary, and a single face sheet below said cover and having on one face, only, delineated locations for answers, only, wholly concealed beneath the cover, certain of said delineations being distinctively distinguished visibly from other delineations to permit separate merit ratings for differentially qualified ones of the suggested answers.

4. In a device for use in giving examinations of the kind in which the examinee indicates answers which he desires to give to the questions by marking through an apertured sheet upon a sheet below, a numerously apertured top cover, an imperforate back cover, a single sheet leaf between said covers, and linear markings on said leaf leading from certain outlined locations on the sheet below certain of the cover apertures to indicate said locations as associated together when the leaf is removed from the covers, said linear markings and outlined locations being wholly concealed by the top cover when the sheet is operatively assembled therewith.

5. In a device for use in giving examinations of the kind in which the examinee indicates answers which he desires to give to the questions by marking through an apertured sheet upon a sheet below, an apertured top cover, a single leaf sheet removably placed beneath said cover having on one face, only, next the top cover lines for certain places on the sheet relative to and beneath certain apertures of the top cover, said lines being wholly concealed below the top cover.

6. In a device for use in giving examinations of the kind in which the examinee indicates answers which he desires to give to the questions by marking through an apertured sheet upon a sheet below, an apertured cover, and a single leaf sheet positioned below said cover and having on its contacting face, only, printed or otherwise visibly delineated indices for placing in a related association certain marked locations on the sheet relative to certain apertures of the cover, said indices being wholly concealed beneath the cover.

7. In a device for use in giving examinations of the kind in which the examinee indicates answers which he desires to give to the questions by marking through an apertured sheet upon a sheet below, a cover having apertures of relatively small size, and a single sheet removably mounted beneath the cover having visibly denoted locations thereon under certain of said cover apertures but of larger area to be wholly concealed beneath the cover.

8. In a device for use in giving examinations of the kind in which the examinee indicates answers which he desires to give to the questions by marking through an apertured sheet upon a sheet below, a cover having apertures of relatively small size, and a single sheet removably mounted beneath the cover having visibly denoted locations under certain of said cover apertures but of larger area, and also having visibly delineated marks thereon for associating together certain of said locations, both the said locations and said marks being concealed beneath the cover.

9. In a device for use in giving examinations of the kind in which the examinee indicates answers which he desires to give to the questions by marking through an apertured sheet upon a sheet below, a top cover having a plurality of relatively small apertures, and a removable single sheet beneath said cover having certain locations delineations of varied appearance and larger than said apertures to receive therethrough answer marks, and said delineations to be wholly concealed by said cover when centered below corresponding apertures of the cover.

In testimony whereof I affix my signature.

JAMES A. WILEY.